(12) United States Patent
Kubo et al.

(10) Patent No.: US 10,006,559 B2
(45) Date of Patent: Jun. 26, 2018

(54) VALVE DEVICE

(71) Applicants: JTEKT CORPORATION, Osaka-shi, Osaka (JP); TOYOTA JIDOSHA KABUSHIKI KAISHA, Toyota-shi, Aichi-ken (JP)

(72) Inventors: Toshikatsu Kubo, Kariya (JP); Akira Nakano, Okazaki (JP); Shusuke Inagi, Okazaki (JP); Akira Yamashita, Toyota (JP)

(73) Assignees: JTEKT CORPORATION, Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 86 days.

(21) Appl. No.: 14/593,323

(22) Filed: Jan. 9, 2015

(65) Prior Publication Data
US 2015/0198261 A1 Jul. 16, 2015

(30) Foreign Application Priority Data
Jan. 15, 2014 (JP) .................. 2014-004815

(51) Int. Cl.
*F16K 31/06* (2006.01)
*F16K 27/02* (2006.01)
(Continued)

(52) U.S. Cl.
CPC ........ *F16K 31/0655* (2013.01); *F16K 27/029* (2013.01); *F16K 27/0254* (2013.01);
(Continued)

(58) Field of Classification Search
CPC ..... F16K 31/0655; F16K 27/029; F16K 27/12
(Continued)

(56) References Cited

U.S. PATENT DOCUMENTS 4,002,185 A * 1/1977 Konczal .................. F16K 27/08
137/338
4,124,192 A * 11/1978 White .................. F16K 31/0668
251/129.15
(Continued)

FOREIGN PATENT DOCUMENTS

DE 102006037695 A1 2/2008
DE 102009055293 A1 6/2011
(Continued)

OTHER PUBLICATIONS

Jun. 12, 2015 Search Report issued in European Patent Application No. 15151323.1.
(Continued)

*Primary Examiner* — Seth W Mackay-Smith
(74) *Attorney, Agent, or Firm* — Oliff PLC

(57) ABSTRACT

A valve device includes: a body including a gas passage through which gas flows and an accommodation recess that communicates with the gas passage; a valve mechanism that controls flow of the gas flowing through the gas passage; and a cover fixed to the body such that the cover covers the accommodation recess. In the valve device, the cover includes a cover recess that opens toward the accommodation recess, and the valve mechanism is assembled to the body such that the valve mechanism is accommodated in the accommodation recess with a portion of the valve mechanism protruding from the accommodation recess and the portion of the valve mechanism is accommodated in the cover recess.

4 Claims, 4 Drawing Sheets

(51) Int. Cl.
F16K 27/10 (2006.01)
F16K 27/12 (2006.01)
F16K 31/40 (2006.01)
F17C 13/04 (2006.01)

(52) U.S. Cl.
CPC ............ *F16K 27/12* (2013.01); *F16K 31/408* (2013.01); *F17C 13/04* (2013.01); *F17C 2205/0326* (2013.01); *F17C 2205/0385* (2013.01); *F17C 2205/0391* (2013.01); *F17C 2221/012* (2013.01); *F17C 2270/0184* (2013.01); *Y02E 60/321* (2013.01); *Y02P 90/45* (2015.11)

(58) Field of Classification Search
USPC .................................................. 251/129.15
See application file for complete search history.

(56) References Cited

U.S. PATENT DOCUMENTS

| | | | |
|---|---|---|---|
| 4,538,228 A | 8/1985 | Brearey et al. | |
| 5,449,019 A | 9/1995 | Hara | |
| 5,845,672 A * | 12/1998 | Reuter | B60T 8/3675 137/315.03 |
| 7,926,782 B2 * | 4/2011 | Tsuruta | B60T 8/3675 137/884 |
| 8,479,773 B2 * | 7/2013 | Kratzer | B60T 8/363 137/884 |
| 2002/0088440 A1 * | 7/2002 | Weldon et al. | F02M 25/0836 123/519 |
| 2005/0035319 A1 * | 2/2005 | Sanada | B60T 8/368 251/129.01 |
| 2012/0097282 A1 * | 4/2012 | Coombs | F15B 13/0814 137/861 |
| 2012/0199775 A1 * | 8/2012 | Watanabe | F16K 31/408 251/129.15 |
| 2014/0048732 A1 | 2/2014 | Heyer et al. | |

FOREIGN PATENT DOCUMENTS

| | | | | |
|---|---|---|---|---|
| GB | 867814 A | * | 5/1961 | ......... F16K 31/0675 |
| JP | 2005-127407 A | | 5/2005 | |
| JP | 2011089569 A | | 5/2011 | |

OTHER PUBLICATIONS

Mar. 28, 2017 Office Action issued in European Patent Application No. 15151323.1.

* cited by examiner

VALVE DEVICE

INCORPORATION BY REFERENCE

The disclosure of Japanese Patent Application No. 2014-004815 filed on Jan. 15, 2014 including the specification, drawings and abstract is incorporated herein by reference in its entirety.

BACKGROUND OF THE INVENTION

1. Field of the Invention

The invention relates to a valve device.

2. Description of Related Art

The conventionally known valve devices each include a vale device that is attached to a hydrogen gas tank mounted in, for example, a fuel cell vehicle, and controls high-pressure gas flowing into and from the gas tank (Japanese Patent Application Publication No. 2011-89569 (JP-A-2011-89569)). The valve device described above includes a body in which a gas passage that provide communication between an inside and an outside of the gas tank is provided, and a valve mechanism that controls flow of hydrogen gas in the gas passage. An accommodation recess that communicates with the gas passage is also provided in the body, and the valve mechanism is accommodated in the accommodation recess and thus assembled to the body.

In the valve device described in JP-A-2011-89569, since the whole valve mechanism is accommodated in the accommodation recess (See FIG. 1 in the JP-A-2011-89569), a size including a depth of the accommodation recess needs to be changed depending on a size of the valve mechanism. On the other hand, a sealing member, such as an O-ring, is provided between the accommodation recess and a member of the valve mechanism in order to keep the valve device airtight. This requires the accommodation recess to have high dimensional accuracy. Accordingly, when manufacturing the valve device, it is necessary to form a deep hole as the accommodation recess in the body with high dimensional accuracy. As a result, the manufacturing process of the body may become complicated.

SUMMARY OF THE INVENTION

The invention provides a valve device including a body that is manufacturable easily.

An aspect of the invention relates to a valve device including: a body including a gas passage through which gas flows and an accommodation recess that communicates with the gas passage; a valve mechanism that controls flow of the gas flowing through the gas passage; and a cover fixed to the body such that the cover covers the accommodation recess. In the valve device, the cover includes a cover recess that opens toward the accommodation recess, and the valve mechanism is assembled to the body such that the valve mechanism is accommodated in the accommodation recess with a portion of the valve mechanism protruding from the accommodation recess and the portion of the valve mechanism is accommodated in the cover recess.

According to the above configuration, the valve mechanism is accommodated in the accommodation recess with the portion of the valve mechanism protruding from the accommodation recess of the body, and the protruding portion of the valve mechanism is accommodated in the cover recess of the cover. Thus, a depth of the accommodation recess can be reduced as compared with a case where the whole valve mechanism is accommodated in the accommodation recess. This facilitates formation of the accommodation recess in the body.

the cover may be fixed to the body by a bolt, the cover may include an insertion hole in which the bolt is loosely fitted. In this case; a first gap defined between a wall of the cover, which defines the insertion hole, and the bolt in a perpendicular direction perpendicular to an axial direction of the bolt may be smaller than a second gap defined between an inner periphery of the cover, which defines the cover recess, and the valve mechanism in the perpendicular direction.

According to the above configuration, if the position of the cover with respect to the body changes when a force is applied to the cover, the wall of the cover, which defines the insertion hole, is brought into contact with the bolt before the cover is brought into contact with the valve mechanism. As a result, movement of the cover is restricted, which reduces the possibility of damage to the valve mechanism caused by the contact of the cover with the valve mechanism.

The gas passage may include a supply passage through which the gas is supplied from a gas tank to the valve mechanism, and an outlet passage through which the gas is supplied from the valve mechanism to a supply destination. The supply passage may open into the accommodation recess, and the outlet passage opens in a bottom portion of the accommodation recess. The valve mechanism may include a sleeve including a cylindrical portion and a bottom portion, a movable core provided in the cylindrical portion so as to be movable in an axial direction of the cylindrical portion, a fixed core fixed to a portion of the cylindrical portion that is closer to an opening of the cylindrical portion than the movable core is, and a solenoid provided on an outer periphery of the cylindrical portion. The sleeve may include a communicating groove that communicates with the supply passage, an introduction passage that provides communication between the communicating groove and an inside of the cylindrical portion, and a lead-out passage that provides communication between the inside of the cylindrical portion and the outlet passage. The communicating groove may open outwardly in a radial direction of the cylindrical portion, and extends in a circumferential direction of the cylindrical portion. In this case, the valve mechanism may be accommodated in the accommodation recess such that the introduction passage is positioned away from a position of an opening of the supply passage in the accommodation recess in the circumferential direction.

When the valve device 1 is used during long time, for example, a tiny amount of moisture contained in the hydrogen gas may be gradually collected and condensed into water drops in the supply passage. In this case, if the condensed water drops enter the cylindrical portion of the sleeve and adhere to the members such as the movable core, the members to which the water drops adheres may become rusty. According to the above configuration, the introduction passage communicates with the supply passage via the communicating groove, and the introduction passage and the opening position of the supply passage provided in the accommodation recess are positioned away from each other. This keeps the water drops from entering the cylindrical portion 51 of the sleeve from the supply passage, and thus prevents the members in the cylindrical portion from becoming rusty.

The solenoid may be provided with a connecting line that extends from the portion of the solenoid, which protrudes from the accommodation recess, and the valve mechanism may include a position holding member that holds the solenoid and the sleeve such that a positional relationship in the circumferential direction between the introduction passage and the connecting line satisfies a predetermined assembled positional relationship.

According to the above configuration, the positional relationship between the introduction passage and connecting line is maintained at the predetermined assembled positional relationship. Thus, by using the connecting lines, provided in the portion of the solenoid protruding from the accommodation recess, as a marker for putting the solenoid valve in the accommodation recess, the introduction passage and the opening position of the supply passage can be positioned away from each other easily.

A marker may be provided on an outer periphery of the sleeve at a position corresponding to the introduction passage. According to the configuration, the marker is provided on the outer periphery of the sleeve. This makes it possible to position the introduction passage and the connecting lines such that the positional relationship between the introduction passage and the connecting lines in the circumferential direction satisfies the predetermined assembled positional relationship.

According to the invention, a body can be manufactured easily.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
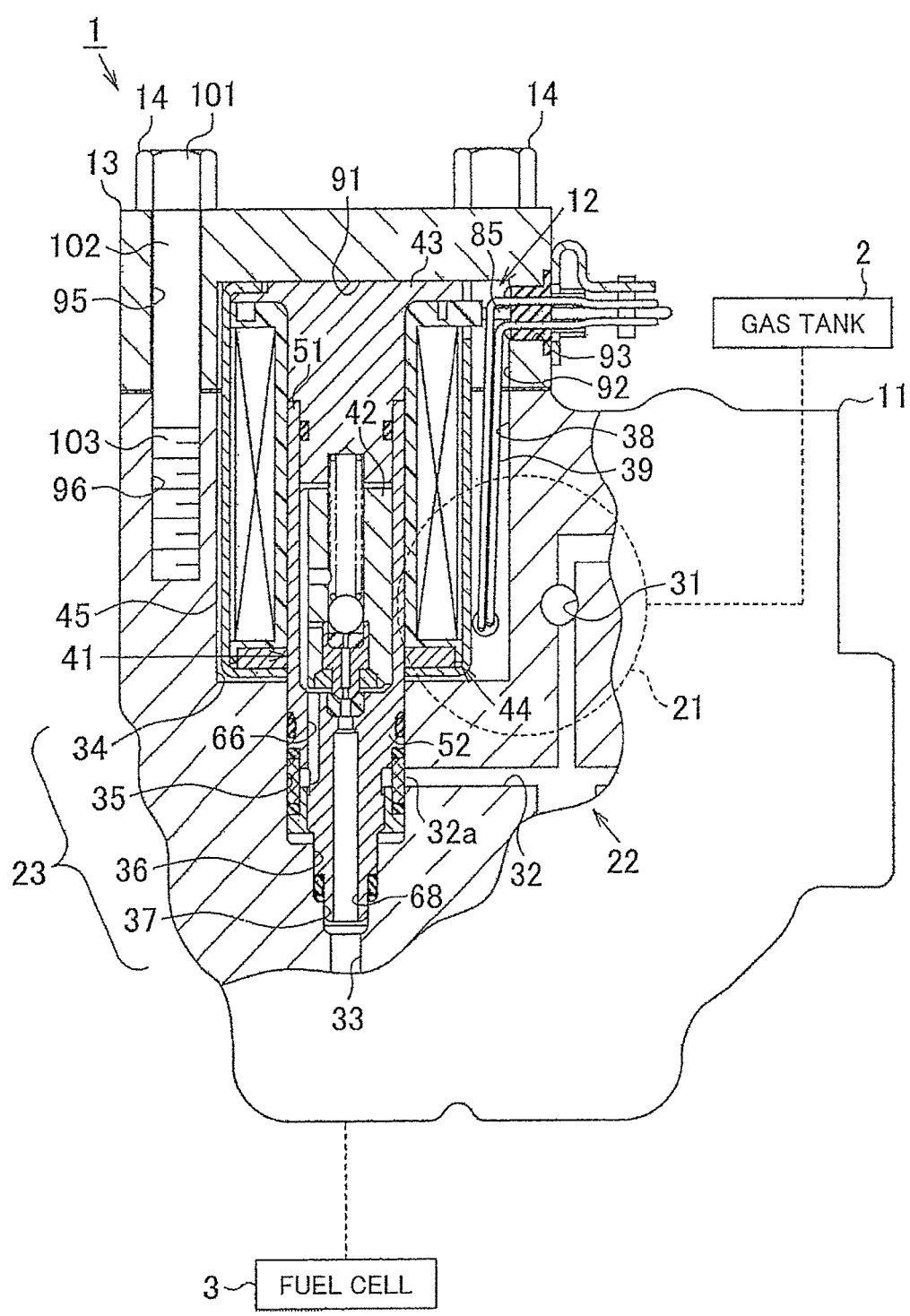
FIG. 1 is a fragmentary sectional view showing a planar structure of a valve device.

Hereinafter, an embodiment of a valve device will be described with reference to the drawings. The valve device 1 shown in FIG. 1 is assembled to a gas tank 2 and controls hydrogen gas to be supplied to a fuel cell 3 mounted in a vehicle. Hydrogen gas with high pressure (70 MPa, for example) is retained in the gas tank 2.

As shown in FIG. 1, the valve device 1 includes a body 11, a solenoid valve 12 assembled to the body 11 as a valve mechanism, and a cover 13 that covers a portion of the solenoid valve 12. The cover 13 is fixed to the body 11 by bolts 14, and thus the solenoid valve 12 is assembled to the body 11. For the purpose of illustration, FIG. 1 shows only the solenoid valve 12 assembled to the body 11, although members other than the solenoid valve 12 including joints and various types of valve mechanisms, such as a manual valve, are assembled to the body 11.

First, the configuration of the body 11 will be described. The body 11 has a flat square box shape. A columnar attachment portion 21 is provided on a lower surface of the body 11, where a surface illustrated in FIG. 1 is taken as an upper surface. The attachment portion 21 is inserted in an attachment opening of the gas tank 2, which is not shown in the drawings. The body 11 according to the embodiment is made of a metal material, such as a forged aluminum alloy.

A gas passage 22 and an accommodation recess 23 are provided in the body 11. When the body 11 is assembled to the gas tank 2, the gas passage 22 provides communication between an inside and an outside of the gas tank 2, and the accommodation recess 23 communicates with the gas passage 22.

Specifically, the gas passage 22 includes a connecting passage 31, a supply passage 32, and an outlet passage 33. The connecting passage 31 is passed through the attachment portion 21 and connected to the inside of the gas tank 2. The supply passage 32 communicates with the connecting passage 31 and opens into the accommodation recess 23. The outlet passage 33 opens on a bottom surface (i.e., the deepest portion) of the accommodation recess 23 and a side surface of the body 11, and is connected to the fuel cell 3 as a supply destination. The accommodation recess 23 is a stepped circular recess. The accommodation recess 23 includes an outer recessed portion 34 that opens on the side surface of the body 11, a large recessed portion 35 that opens on a bottom surface of the outer recessed portion 34, an intermediate recessed portion 36 that opens on a bottom surface of the large recessed portion 35, and a small recessed portion 37 that opens on a bottom surface of the intermediate recessed portion 36. The outer recessed portion 34 has the inner diameter larger than that of the large recessed portion 35, the large recessed portion 35 has the inner diameter larger than that of the intermediate recessed portion 36, and the intermediate recessed portion 36 has the inner diameter larger than that of the small recessed portion 37. All recessed portions 34, 35, 36, 37 are provided coaxially. An extension groove 38 that extends in the axial direction of the outer recessed portion 34 (i.e., the up-down direction in FIG. 1) is provided in an inner periphery of the outer recessed portion 34. Connecting lines (e.g., wires or cables) 39 of a temperature sensor (not shown in the drawings) disposed in the gas tank 2, for example, are pulled out from a side surface of the extension groove 38. The supply passage 32 opens on an inner periphery of the large recessed portion 35. The outlet passage 33 is connected to a bottom surface of the small recessed portion 37.

Figure 2:
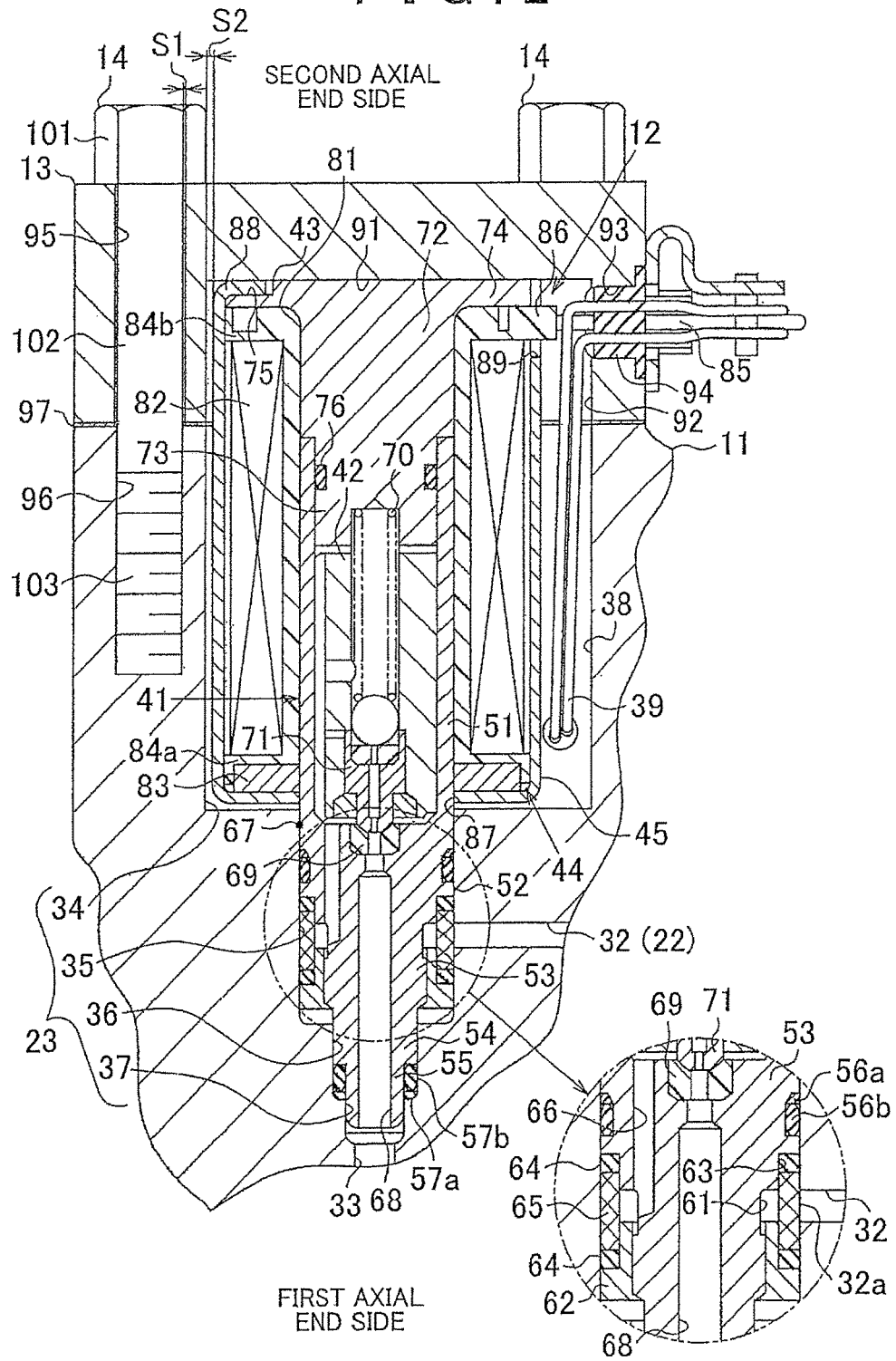
FIG. 2 is a sectional view of a solenoid valve and its vicinity.

Next, the configuration of the solenoid valve 12 will be described. As shown in FIG. 2, the solenoid valve 12 includes a sleeve 41, a movable core 42, a fixed core 43, and a solenoid 44, and a case 45 as a position holding member. In the following description, a side toward which a depth of the accommodation recess 23 increases (i.e., a side where the small recessed portion 37 is provided) is taken as a first axial end side, and a side opposite to the first axial end side is taken as a second axial end side.

The sleeve 41 includes a cylindrical portion 51 and a bottom portion 52. Each of the outer diameter and the inner diameter of the cylindrical portion 51 is substantially constant along its length in the axial direction. The bottom portion 52 has a stepped shape in which the outer diameter of the bottom portion 52 is gradually reduced toward the first axial end side. The bottom portion 52 includes a large diameter portion 53 that extends from the cylindrical portion 51 toward the first axial end side, an intermediate diameter portion 54 that extends from the large diameter portion 53 toward the first axial end side, and a small diameter portion 55 that extends from the intermediate diameter portion 54 toward the first axial end side. The outer diameter of the large diameter portion 53 is substantially equal to the inner diameter of the large recessed portion 35, the outer diameter of the intermediate diameter portion 54 is substantially equal to the inner diameter of the intermediate recessed portion 36, and the outer diameter of the small diameter portion 55 is substantially equal to the inner diameter of the small recessed portion 37. The sleeve 41 is accommodated in the accommodation recess 23 in a state where the small diameter portion 55 fits in the small recessed portion 37, the intermediate diameter portion 54 fits in the intermediate recessed portion 36, and the large diameter portion 53 fits in the large recessed portion 35. In order to keep the valve device 1 airtight, a back-up ring 56a and an O-ring 56b are provided between the large diameter portion 53 and the large recessed portion 35, and a back-up ring 57a and an O-ring 57b are provided between the small diameter portion 55 and the small recessed portion 37.

A communicating groove 61 that extends in the circumferential direction is provided in an outer periphery of the large diameter portion 53. The communicating groove 61 is provided at a position in which the communicating groove 61 faces an opening position 32a of an opening of the supply passage 32 in the inner periphery of the large recessed portion 35. An annular groove defining member 62 is press-fitted in a portion of the communicating groove 61 on the first axial end side, and a shallow groove 63 that is shallower than the communicating groove 61 and continuous with the communicating groove 61 is provided on the second axial end side. A metal mesh filter 65 is provided radially outward of the communicating groove 61 while being sandwiched between the shallow groove 63 and the groove defining member 62 via sealing members 64. An introduction passage 66 that provides communication between the communicating groove 61 and an inside of the cylindrical portion 51 (i.e., a valve chamber) is provided in a bottom portion 52. The introduction passage 66 extends linearly along the axial direction, and is provided at a position offset from the center of the bottom portion 52. On an outer periphery of the bottom portion 52 according to the embodiment, a marker 67 is provided by, for example, ink adhesion at a position overlapped with the introduction passage 66 in the radial direction when viewed from the center of the bottom portion 52. In the drawings, the marker 67 is indicated by a solid dot for the purpose of illustration. A lead-out passage 68 that provides communication between the inside of the cylindrical portion 51 and the outlet passage 33 is provided in the bottom portion 52. The lead-out passage 68 extends linearly along the axial direction, and is provided at the center of the bottom portion 52. An annular valve seat 69 is fixed on an opening of the introduction passage 66 on the second axial end side (On a side where the cylindrical portion 51 is positioned).

The movable core 42 has a columnar shape. The outer diameter of the movable core 42 is substantially equal to the inner diameter of the cylindrical portion 51 of the sleeve 41. The movable core 42 is accommodated in the cylindrical portion 51 so as to be movable in the axial direction. The movable core 42 is urged by a coil spring 70 toward the first axial end side. A valve body 71 is provided so as to be movable with the movable core 42 in the axial direction with the movable core 42. The valve body 71 closes the lead-out passage 68 when the valve body 71 is placed on the valve seat 69, and opens the lead-out passage 68 when the valve body 71 moves away from the valve seat 69. The movable core 42 according to the embodiment has a mechanism generally known as the pilot valve mechanism, which allows a small amount of hydrogen gas to flow between the inside of the cylindrical portion 51 and the lead-out passage 68 before the valve body 71 leaves the valve seat 69 as the movable core 42 moves in the axial direction.

Figure 3:
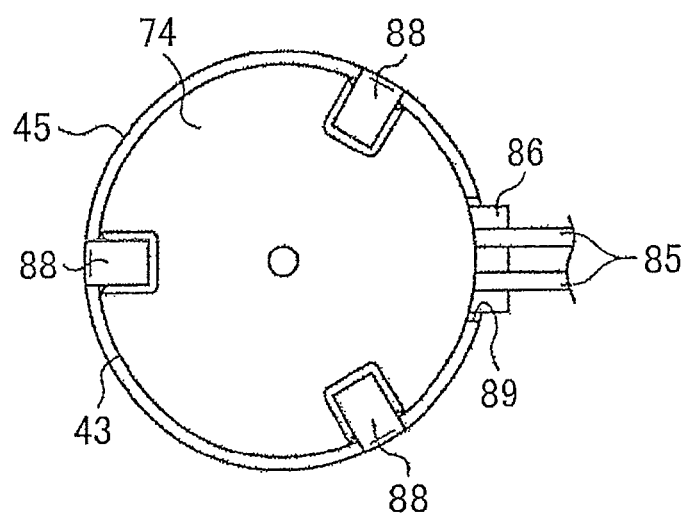
FIG. 3 is a side view of the solenoid valve.

As shown in the FIGS. 2 and 3, the fixed core 43 has a stepped columnar shape. The fixed core 43 includes a base portion 72, a press-fitted portion 73 that extends from the base portion 72 towards the first axial end side, and a flange portion 74 that extends outwardly in the radial direction at an end of the base portion 72 on the second axial end side. The outer diameter of the press-fitted portion 73 is substantially equal to the inner diameter of the cylindrical portion 51 of the sleeve 41, and the outer diameter of the base portion 72 is substantially equal to the outer diameter of the cylindrical portion 51. A plurality of positioning grooves 75, three in the embodiment, is provided in the flange portion 74, at equal angle intervals in the circumferential direction. Each positioning groove 75 opens outwardly, and at the same time, opens toward the second axial end side. The fixed core 43 is fixed to the sleeve 41 such that the press-fitted portion 73 is press-fitted in the cylindrical portion 51, and a position of one positioning groove 75 in the circumferential direction coincides with a position of the marker 67 of the sleeve 41 in the circumferential direction, that is, a position of the introduction passage 66 in the circumferential direction. An O-ring 76 is provided between the press-fitted portion 73 and the cylindrical portion 51.

The solenoid 44 includes a cylindrical bobbin 81, a coil 82 provided around the bobbin 81, and an annular yoke 83. The inner diameter of the bobbin 81 is substantially equal to the outer diameter of the cylindrical portion 51 of the sleeve 41 as well as the outer diameter of the base portion 72 of the fixed core 43. A length of the bobbin 81 (the solenoid 44) along the axial direction is greater than a depth (a length along the axial direction) of the outer recessed portion 34. Flange portions 84a, 84b that extend outwardly are provided respectively on the opposite sides of the bobbin in the axial direction. The outer diameter of each of the flange portions 84a, 84b is substantially equal to the outer diameter of the flange portion 74 of the fixed core 43. A terminal portion 86 protrudes outwardly from the flange portion 84b provided on the second axial end side. Connecting lines (e.g., wires or cables) 85 connected to the coil 82 extend from the terminal portion 86. The bobbin 81 is fitted over outer peripheries of the cylindrical portion 5 land the base portion 72 such that the terminal portion 86 and the marker 67 are positioned 180 degrees away from each other in the circumferential direction, that is, the sleeve 41 (the introduction passage 66) and the solenoid 44 (the connecting line 85) satisfy a predetermined assembled positional relationship in the circumferential direction. The inner diameter of the yoke 83 is substantially equal to the outer diameter of the cylindrical portion 51, and the outer diameter of the yoke 83 is slightly smaller than each of the outer diameters of the flange portions 84a, 84b. The yoke 83 is positioned adjacent to the flange portion 84a on the first axial end side, and is fitted onto the outer periphery of the cylindrical portion 51.

The case 45 has a cylindrical shape with a bottom portion. Each of the outer diameter and the inner diameter of the entire case 45 is substantially constant along its length in the axial direction. The inner diameter of the case 45 is substantially equal to each of the outer diameters of the flange portions 84a, 84b of the bobbin 81, and the outer diameter of the case 45 is smaller than the inner diameter of the outer recessed portion 34. A through-hole 87 having the inner diameter, which is substantially equal to the outer diameter of the cylindrical portion 51; is provided in the bottom portion of the case 45. A plurality of holders 88, three in the embodiment, is provided at an opening edge of an opening of the case 45, at equal angle intervals in the circumferential direction. Each holder 88 extends in the axial direction. One notch 89 is provided in the opening edge of the case 45, at an intermediate position between the two adjacent holders 88. The case 45 is fitted onto an outer periphery of the solenoid 44 with the terminal portion 86 projecting from the notch 89. Each holder 88 is bent to engage with the corresponding positioning groove 75 of the fixed core 43. As a result, a positional relationship in the circumferential direction between the introduction passage 66 of the sleeve 41 and the connecting lines 85 of the solenoid 44 that extends from the terminal portion 86 is maintained at the predetermined assembled positional relationship in which the introduction passage 66 and the connecting lines 85 are positioned about 180 degrees away from each other.

The solenoid valve 12 is assembled to the body 11 such that end portions of the fixed core 43, the solenoid 44, and the case 45 on the second axial end side protrude from the accommodation recess 23, and the position of the connecting lines 85 (the terminal portion 86) in the circumferential direction substantially coincides with the opening position 32a of the supply passage 32. As a result, the introduction passage 66 and the opening position 32a of the supply passage 32 are positioned 180 degrees away from each other.

Next, the configuration of the cover 13 will be described. As shown in the FIG. 2, the cover 13 has a generally cup shape. The cover 13 is made of a metal material, such as a forged aluminum alloy. A cover recess 91 that opens toward the first axial end side (a side where the accommodation recess 23 is provided) is provided in the cover 13. The cover recess 91 is defined by a cylindrical inner periphery of the cover 13. The diameter of the cover recess 91 is substantially equal to the inner diameter of the outer recessed portion 34, and a depth of the cover recess 91 is substantially equal to a length of the portion of the solenoid valve 12, which protrudes from the accommodation recess 23, along the axial direction. An extension groove 92 that extends in the axial direction and opens toward the first axial end side is provided in the inner periphery of the cover recess 91, at a position in which the extension groove 92 faces the extension groove 38 of the outer recessed portion 34. A pull-out hole 93 that extends through the cover 13 in the radial direction is provided in a bottom portion of the extension groove 92 (i.e., in a side portion of the cover 13 on which the extension groove 92 is provided). The connecting lines 85 of the solenoid 44 and the connecting lines 39 of the above described sensors are passed through the pull-out hole 93 with a grommet 94 being interposed, and led to the outside of the valve device 1.

A plurality of insertion holes 95, each of which passes through the cover 13 in the axial direction, is provided around the cover recess 91 in the cover 13, at equal angle intervals in the circumferential direction. On the other hand, a plurality of threaded holes 96 is provided around the accommodation recess 23 in the body 11, at positions in which the threaded holes 96 face the insertion holes 95. The bolts 14 loosely inserted into the insertion holes 95 are threaded into the threaded holes 96, and thus the cover 13 is fixed to the body 11. An annular gasket 97 is provided between the cover 13 and the body 11.

Each bolt 14 includes a head 101, a cylindrical shank 102 that extends from the head 101 toward the first axial end side, and a thread 103 that extends from the shank 102 toward the first axial end side. The thread 103 is threaded into the threaded hole 96 with the shank 102 being disposed in the insertion hole 95. The diameter of the head 101 is larger than the diameter of the shank 102, and the diameter of the shank 102 is larger than the diameter of the thread 103. The diameter of the shank 102 is slightly smaller than the diameter of the insertion hole 95, and the shank 102 is loosely fitted in the insertion hole 95. Specifically, the diameter of the shank 102 is set such that a first gap S1 defined between the shank 102 and a wall of the cover 13, which defines the insertion hole 95, in the perpendicular direction perpendicular to the axial direction is smaller than a second gap S2 defined between the inner periphery of the cover 13, which defines the cover recess 91, and the solenoid valve 12 (the case 45) in the perpendicular direction.

Hereinafter, the operation of the solenoid valve 12 will be described. In the solenoid valve 12, when driving current is not supplied to the coil 82, the movable core 42 is urged toward the valve seat 69 by an urging force of the coil spring 70 and a pressure of the hydrogen gas. At this time, the valve body 71 is placed on the valve seat 69, and thus the lead-out passage 68 is closed. In this case, the hydrogen gas supplied from the supply passage 32 reaches the cylindrical portion 51 via the communicating groove 61, but the hydrogen gas is not supplied to the outlet passage 33. When the driving current is supplied to the coil 82, on the other hand, the movable core 42 is drawn by the fixed core 43 and moves in a direction away from the valve seat 69, against the urging force of the coil spring 70. Then, the valve body 71 leaves the valve seat 69 and thus the lead-out passage 68 is opened. In this case, after the hydrogen gas supplied from the supply passage 32 reaches the inside of the cylindrical portion 51 via the communicating groove 61 and the introduction passage 66, the hydrogen gas is supplied, via the lead-out passage 68, to the outlet passage 33 and then to the fuel cell 3.

Next, the manufacturing process of the valve device 1 according to the embodiment will be described. The body 11 is shaped by forging first. Subsequently, the accommodation recess 23, the supply passage 32, the outlet passage 33, and others are formed by cutting. In a similar way, the cover 13 is shaped by forging, and subsequently, the cover recess 91, the pull-out hole 93, and others are formed by cutting.

Figure 4A:
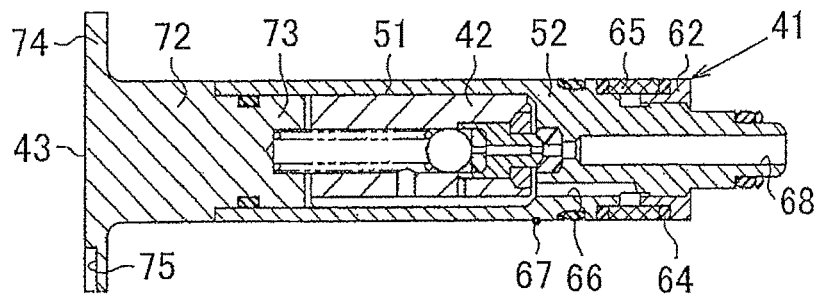
FIGS. 4A to 4C are schematic views showing a procedure for assembling the solenoid valve.
Figure 4B:
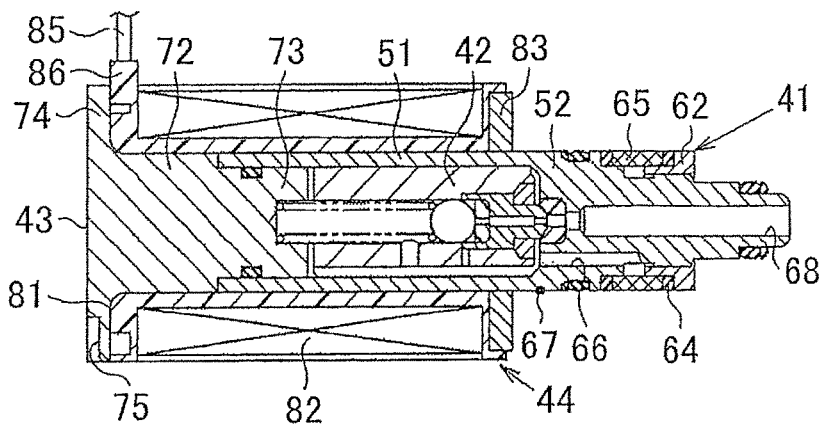
Figure 4C:
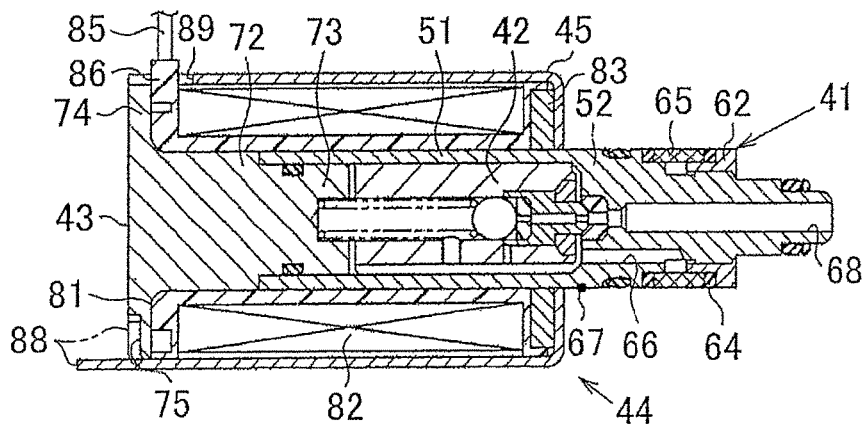

The solenoid valve 12 is assembled from components prepared in the predetermined processes, according to the following procedure. Specifically, as shown in FIG. 4A, the fixed core 43 is fixed to the cylindrical portion 51 such that the position of one positioning groove 75 of the fixed core 43 in the circumferential direction coincides with the position of the marker 67 in the circumferential direction, in a state where components other than the solenoid 44 and the case 45, such as the movable core 42, are assembled to the sleeve 41. Next, as shown in FIG. 4B, the solenoid 44 is fitted over the outer periphery of the sleeve 41 and the outer periphery of the fixed core 43 such that the connecting lines 85 (the terminal portion 86) and the marker 67 are 180 degrees away from each other in the circumferential direction. Then, as shown in FIG. 4C, the case 45 is fitted onto the outer periphery of the solenoid 44, and as shown by the alternate long and two short dashes line in FIG. 4C, the holders 88 are bent toward the positioning grooves 75 to maintain the positional relationship between the sleeve 41 and the solenoid 44 in the circumferential direction at the predetermined assembled positional relationship.

After the solenoid valve 12 is assembled as described above, the solenoid valve 12 is inserted in the accommodation recess 23 such that, when viewed from the center of the accommodation recess 23, the position of the connecting lines 85 in the circumferential direction coincides with the position of the opening position 32a of the supply passage 32 in the circumferential direction. Next, while the connecting lines 39, 85 are pulled out from the pull-out hole 93 of the cover 13, the solenoid valve 12 is covered with the cover 13 such that the portion of the solenoid valve 12, which protrudes from the accommodation recess 23, is accommodated in the cover recess 91, and the cover 13 is fixed to the body 11 by the bolts 14. Then, the various types of valve mechanism other than the solenoid valve 12 is assembled to the body 11, and thus the valve device 1 is manufactured.

According to the embodiment, as described above, the following functions and advantages are achieved. The solenoid valve 12 is accommodated in the accommodation recess 23 with the portion of the solenoid valve 12 protruding from the accommodation recess 23 of the body 11, and the protruding portion of the solenoid valve 12 is accommodated in the cover recess 91 of the cover 13. Thus, the depth of the accommodation recess 23 can be reduced as compared with a case where the whole solenoid valve 12 is accommodated in an accommodation recess. This facilitates formation of the accommodation recess 23 in the body 11. In addition, the reduced depth of the accommodation recess 23 can reduce deformation of the body 11, and thus the yield with respect to the material improves when the body 11 is shaped by forging.

The first gap S1 defined between the shank 102 and the wall of the cover 13, which defines the insertion hole 95, is smaller than the second gap S2 defined between the inner periphery of the cover 13, which defines the cover recess 91, and the case 45 of the solenoid valve 12. Thus, if the position of the cover 13 with respect to the body 11 changes when a force is applied to the cover 13, the wall of the cover 13, which defines the insertion hole 95, is brought into contact with the shank 102 of the bolt 14 before the cover 13 is brought into contact with the solenoid valve 12. As a result, movement of the cover 13 is restricted, which reduces the possibility of damage to the solenoid valve 12 caused by the contact of the cover 13 with the solenoid valve 12.

The solenoid valve 12 is accommodated in the accommodation recess 23 such that, the introduction passage 66 and the opening position 32a of the supply passage 32 are positioned 180 degrees away from each other in the circumferential direction. When the valve device 1 is used during long time, a tiny amount of moisture contained in the hydrogen gas may be gradually collected and condensed into water drops in the supply passage 32. In this case, if the condensed water drops enter the cylindrical portion 51 of the sleeve 41 and adhere to the members such as the movable core 42, the members to which the water drops adheres may become rusty. According to the above configuration, the introduction passage 66 and the opening position 32a of the supply passage 32 provided in the accommodation recess 23 are positioned away from each other. This keeps the water drops from entering the cylindrical portion 51 of the sleeve 41 from the supply passage 32, and thus prevents the members in the cylindrical portion 51 from becoming rusty.

The case 45 maintains the positional relationship between the sleeve 41 and the solenoid 44 in the circumferential direction at the predetermined assembled positional relationship. Thus, by using the connecting lines 85, provided in the portion of the solenoid 44 protruding from the accommodation recess 23, as a marker for putting the solenoid valve 12 in the accommodation recess 23, the introduction passage 66 and the opening position 32a of the supply passage 32 can be positioned away from each other easily.

The connecting lines 85 are led to the outside of the valve device 1 from the portion of the solenoid 44 protruding from the accommodation recess 23, via the pull-out hole 93 of the cover 13. This makes it possible to put the solenoid valve 12 in the accommodation recess 23 easily without need for consideration of arrangement of the connecting lines 85 and the like.

The marker 67 is provided on the outer periphery of the sleeve 41 at the position corresponding to the introduction passage 66. This makes it possible to position the introduction passage 66 of the sleeve 41 and the connecting lines 85 of the solenoid 44 such that the positional relationship between the introduction passage 66 of the sleeve 41 and the connecting lines 85 of the solenoid 44 in the circumferential direction satisfies the predetermined assembled positional relationship.

Instead of the above described embodiment, the invention may be carried out in the following embodiments in which the above embodiment is appropriately modified. In the above embodiment, the communicating groove 61 has an annular shape and opens outward in the radial direction. However, the invention is not limited to this, and as long as the communicating groove 61 provides communication between the supply passage 32 and the introduction passage 66, the connecting passage 31 may have a circular ark shape and open outward in the radial direction.

In the above embodiment, the marker 67 may not be provided on the outer periphery of the sleeve 41. In the above embodiment, the holders 88 of the case 45 are bent toward the positioning grooves 75 of the fixed core 43 and engaged with the positioning grooves 75 of the fixed core 43 to hold the positions of the sleeve 41 and the solenoid 44 in the circumferential direction. However, the invention is not limited to this, and adhesive or the like may be used to hold the positions of the sleeve 41 and the solenoid 44 in the circumferential direction. Alternatively, the solenoid valve 12 may be accommodated in the accommodation recess 23 in a state where the positional relationship in the circumferential direction between the sleeve 41 and the solenoid 44 is not maintained.

In the above embodiment, the introduction passage 66 and the opening position 32a of the supply passage 32 are positioned 180 degrees away from each other in the circumferential direction. However, the invention is not limited to this, and the introduction passage 66 and the opening position 32a of the supply passage 32 may be positioned way from each other at an angle smaller than 180 degrees. Alternatively, the position of the introduction passage 66 in the circumferential direction may coincide with the opening position 32a of the supply passage 32.

In the above embodiment, the first gap S1 defined between the wall 13 of the cover 13, which defines the insertion hole 95, and the shank 102 is smaller than the second gap S2 defined between the inner periphery of the cover 13, which defines the cover recess 91, and the case 45 of the solenoid valve 12. However, the first gap S1 and the second gap S2 may have the same size, or the first gap S1 may be larger than the second gap S2. In this case, the cover 13 is fixed to the body 11 by a bolt without a shank.

In the above embodiment, the solenoid valve 12 is assembled to the body 11 such that the solenoid valve 12 is accommodated in the accommodation recess 23 with the portion of the solenoid valve 12 protruding from the accommodation recess 23, and the protruding portion of the solenoid valve 12 is accommodated in the cover recess 91 of the cover 13. However, the embodiment is not limited to this, and a valve mechanism other than the solenoid valve 12 may be assembled to the body 11 in a similar way.

What is claimed is:

1. A valve device comprising:
  a body including a gas passage through which gas flows and an accommodation recess that includes an outer recessed portion that opens on a side surface of the body and communicates with the gas passage;

a valve mechanism which includes a solenoid configured with a bobbin and coil, the valve mechanism configured to control a flow of the gas flowing through the gas passage; and a cover fixed to the body such that the cover covers the accommodation recess, wherein the solenoid protrudes from the accommodation recess;

the cover is dimensioned to cover a single valve mechanism, and is configured such that an outermost wall of the cover is configured with an inner surface that defines a cover recess that opens toward the accommodation recess, a diameter of the cover recess, defined by the inner surface of the outermost wall of the cover, is substantially equal to an inner diameter of the outer recessed portion;

the valve mechanism is assembled to the body such that the valve mechanism is accommodated in the accommodation recess with a portion of at least one of the bobbin and coil protruding from the accommodation recess and the portion of the at least one of the bobbin and coil is accommodated in the cover recess;

the cover is fixed to the body by a bolt and configured such that the valve mechanism is not coupled to the cover;

the cover includes an insertion hole in which the bolt is loosely fitted; and a first gap is defined between a wall of the cover, which defines the insertion hole, and the bolt in a direction perpendicular to an axial direction of the bolt and is smaller than a second gap defined between an inner periphery of the cover, which defines the cover recess, and the valve mechanism in the perpendicular direction.

2. The valve device according to claim 1, wherein:

the gas passage includes a supply passage through which the gas is supplied from a gas tank to the valve mechanism, and an outlet passage through which the gas is supplied from the valve mechanism to a supply destination;

the supply passage opens into the accommodation recess, and the outlet passage opens in a bottom portion of the accommodation recess;

the valve mechanism includes a sleeve including a cylindrical portion and a bottom portion, a movable core provided in the cylindrical portion so as to be movable in an axial direction of the cylindrical portion, a fixed core fixed to a portion of the cylindrical portion that is closer to an opening of the cylindrical portion than the movable core is, and the solenoid provided on an outer periphery of the cylindrical portion;

the sleeve includes a communicating groove that communicates with the supply passage, an introduction passage that provides communication between the communicating groove and an inside of the cylindrical portion, and a lead-out passage that provides communication between the inside of the cylindrical portion and the outlet passage;

the communicating groove opens outwardly in a radial direction of the cylindrical portion, and extends in a circumferential direction of the cylindrical portion; and the valve mechanism is accommodated in the accommodation recess such that the introduction passage is positioned away from a position of an opening of the supply passage in the accommodation recess in the circumferential direction.

3. The valve device according to claim 2, wherein:

the solenoid is provided with a connecting line that extends from the portion of the solenoid, which protrudes from the accommodation recess; and the valve mechanism includes a position holding member that holds the solenoid and the sleeve such that a positional relationship in the circumferential direction between the introduction passage and the connecting line satisfies a predetermined assembled positional relationship.

4. The valve device according to claim 2, wherein a marker is provided on an outer periphery of the sleeve at a position corresponding to the introduction passage.

* * * * *